United States Patent [19]

Herman

[11] Patent Number: 4,783,619
[45] Date of Patent: Nov. 8, 1988

[54] METHOD AND APPARATUS FOR MAINTAINING AUTO VOLTAGE

[75] Inventor: Matthew C. Herman, Racine, Wis.
[73] Assignee: A & E Manufacturing Company, Racine, Wis.
[21] Appl. No.: 98,848
[22] Filed: Sep. 21, 1987
[51] Int. Cl.⁴ .................................. B62D 45/00
[52] U.S. Cl. ........................... 320/2; 307/10 R
[58] Field of Search ........................... 320/2–4, 320/15, 16, 25, 48; 307/10 R

[56] References Cited

U.S. PATENT DOCUMENTS

| | | | |
|---|---|---|---|
| 2,340,765 | 2/1944 | Morch | 320/3 |
| 3,825,740 | 7/1974 | Friedman et al. | 320/3 X |
| 4,207,511 | 6/1980 | Radtke | 320/15 X |
| 4,258,305 | 3/1981 | Anglin | 320/2 |
| 4,321,522 | 3/1982 | Matsunaga | 320/2 |
| 4,327,401 | 4/1982 | Siiberg | 320/4 X |
| 4,617,506 | 10/1986 | Bogie et al. | 320/48 X |
| 4,962,680 | 9/1987 | Sherer | 320/48 X |

Primary Examiner—R. J. Hickey
Attorney, Agent, or Firm—Fuller, Puerner & Hohenfeldt

[57] ABSTRACT

A power supply back-up device is capable of supplying auxiliary electrical power to a motor vehicle when the vehicle storage battery is disconnected. The computer memory back-up device comprises a plug for inserting into the vehicle cigar lighter, a body with contacts for engaging a nine-volt battery, and wires joining the plug and body. Voltage from the nine-volt battery energizes the motor vehicle circuit when the main battery is disconnected for service, thereby enabling computer controlled accessories to retain their pre-set settings. As a result, reprogramming the accessories after removal and restoration of the normal and electrical power is eliminated.

13 Claims, 2 Drawing Sheets

METHOD AND APPARATUS FOR MAINTAINING AUTO VOLTAGE

BACKGROUND OF THE INVENTION

1. Field of the Invention

This invention pertains to electrical power supplies, and more particularly to apparatus for providing auxiliary electric power to motor vehicles.

2. Description of the Prior Art

Many modern automobiles and other motor vehicles are equipped with electrically powered and computer controlled accessories, such as clocks and radios. The accessories usually receive their operating power from the vehicle storage battery. Under normal conditions, the accessories operate continuously and reliably without attention from the vehicle owner.

Occasionally, however, the vehicle must be serviced in a manner that requires disconnection of the storage battery. In those situations, electric power to the vehicle accessories is lost. As a consequence, the programmed memory of the on-board computer that controls the clock, radio, door locks, and other accessories is also lost. After restoration of the power from the vehicle battery, the service man must reset the clock, radio, and other computer controlled accessories. Such resettings are undesirable, because of the increased expense to the owner. In addition, after storage battery disconnection and reconnection, it may take up to 200 miles of driving to reprogram some computer functions.

Thus, a need exists for maintaining electrical power to certain vehicle accessories when normal vehicle power is interrupted.

SUMMARY OF THE INVENTION

In accordance with the present invention, a method and apparatus for maintaining motor vehicle voltage is provided that retains the pre-set settings of on-board battery powered accessories in the absence of the vehicle storage battery. This is accomplished by apparatus that includes two pairs of electrical connectors in conjunction with an auxiliary power source.

The first electrical connector comprises a power plug having a generally cylindrical shaped housing made of an electrically insulated material. Secured in the housing is a first pair of contacts. One of the contacts extends from the housing coaxially with the housing longitudinal axis. The second contact is electrically isolated from the first contact and preferably protrudes above the housing outer surface. The power plug is of a size and shape, and the contacts are located within the housing, such that the plug is suitable for inserting into the conventional cigar lighter of a vehicle. With the plug inserted in the cigar lighter, the power plug first and second contacts are in electrical communication with the positive and negative branches of the vehicle electrical circuit, respectively.

The second electrical connector comprises a small body to which are fastened a pair of electrically isolated contacts. The second electrical contacts are suitable for releasably engaging the poles of an auxiliary battery, which may be a conventional nine-volt battery.

To conduct voltage from the auxiliary battery to the first electrical connector, a pair of electrical wires extend between the first and second electrical connectors. One of the wires connects the negative contact in the power plug with the negative pole of the battery. The wire from the power plug positive contact connects with the positive pole of the auxiliary battery. A small lamp is preferably included in the circuit of one of the electrical wires. The two wires may be quite heavy but flexible, and they may constitute the only mechanical connection between the power plug and battery engaging body. Alternately, the wires may be encased in a protective sleeve that joins the power plug and body.

In operation, the power plug is inserted into the vehicle cigar lighter, and an auxiliary battery is inserted in the second electrical connector before power from the vehicle storage battery is disconnected. In that way, electric power remains continuously supplied to the battery operated accessories to keep them operating properly despite the absence of the normal power source. As a result, the necessity of resetting any battery operated accessories after restoration of the main power supply is eliminated.

Other objects, aims, and advantages of the invention will become apparent to those skilled in the art upon reading the disclosure.

DETAILED DESCRIPTION OF THE INVENTION

Although the disclosure hereof is detailed and exact to enable those skilled in the art to practice the invention, the physical embodiments herein disclosed merely exemplify the invention which may be embodied in other specific structure. The scope of the invention is defined in the claims appended hereto.

Figure 1:
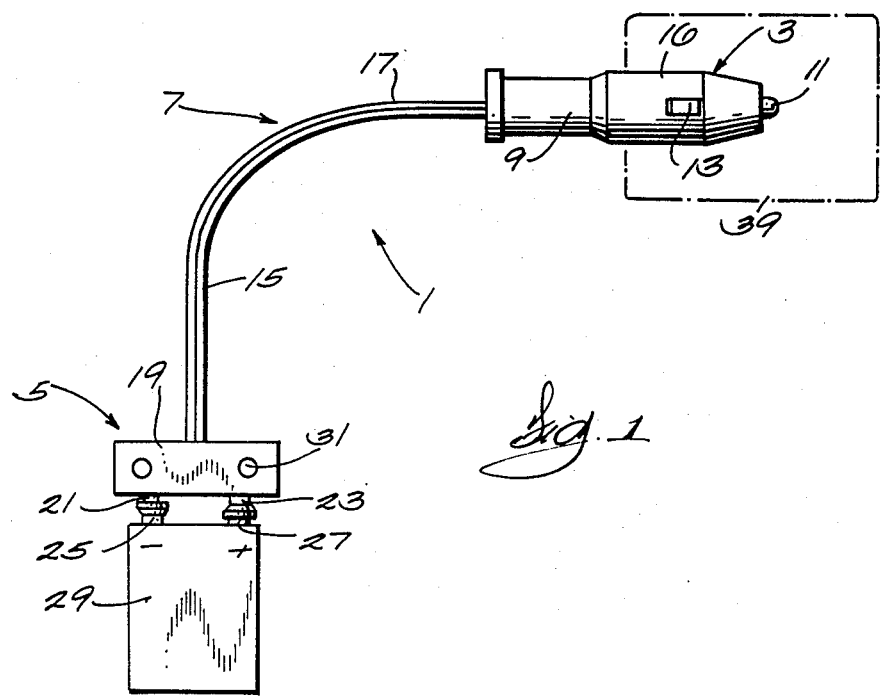
FIG. 1 is a side view of the apparatus of the present invention.

Referring to FIG. 1, a power supply back-up device 1 is illustrated that includes the present invention. The back-up device is particularly useful for transmitting auxiliary electric power to motor vehicles, but it will be understood that the invention is not limited to automotive applications.

The power supply back-up device 1 comprises a first electrical connector 3, a second electrical connector 5, and a pair of electric wires 7 joining the two electrical connectors. The first electrical connector or power plug 3 is composed of a generally cylindrical housing 9 that is made of a tough and endurable non-conducting material. A thermal setting plastic is a suitable material for the housing 9. The interior of the housing 9 may be generally hollow. The housing 9 is designed to tightly secure one end of the wires 7. In FIG. 1 the wires 7 provide support for the battery when the connector 3 is supported in the cigar lighter 39. The housing 9 is further fabricated to retain a first contact 11 and a second contact 13 in electrical isolation from each other. The first contact 11 is made of an electrically conductive material, and it extends from one end of the housing generally along the longitudinal axis of the housing. It is preferred that the first contact 11 be reciprocable along the first electrical connector's axis, and further that it be resiliently biased outwardly from the end of the first electrical connector 3. Biasing can be accomplished by means of a helical spring inserted within the housing 9 in any suitable fashion. An insulated electrical conductor 15 of the pair of wires 7 is secured to the first contact 11 inside the housing 9.

The second contact 13 of the first electrical connector 3 protrudes slightly above the housing cylindrical surface 16. The second contact 13 is firmly joined inside the housing 9 to an electrical conductor 17.

The housing 9 has a shape and dimensions that enables it to be removably inserted into a conventional motor vehicle cigar lighter 39. Thus, the first electrical connector 3 functions a a male plug for being selectively inserted into and removed from the cigar lighter 39. When inserted, the contact 11 becomes part of the vehicle's positive electrical circuit, and the second connector 13 becomes part of the vehicle negative electrical circuit.

Figure 3:
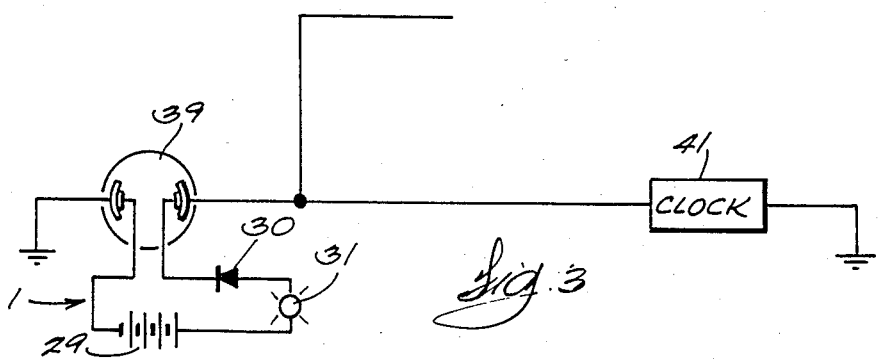
FIG. 3 is an electrical schematic of a portion of an automotive electrical circuit with the apparatus of the present invention installed.

The second electrical connector 5 is composed of a body 19 of electrically insulating material. Mounted in the body 19 are a first contact 21 and a second contact 23. In the preferred embodiment, the contacts 21 and 23 are shaped and sized to releasably engage the negative and positive poles 25, 27, respectively, of a standard nine volt battery 29. The second electrical connector 5 is further constructed such that the contact 21 joins with the insulated electrical conductor 17, and the contact 23 joins with the insulated electrical conductor 15. Thus, the contact 11 of the first electrical connector 3 is connected to the battery positive pole 27 and the contact 13 is connected to the battery negative pole 25. Inserted in the circuit between the second electrical connector's positive contact 23 and the insulated electrical conductor 15 are a small lamp 31 and a diode 30 (FIG. 3).

Figure 4:
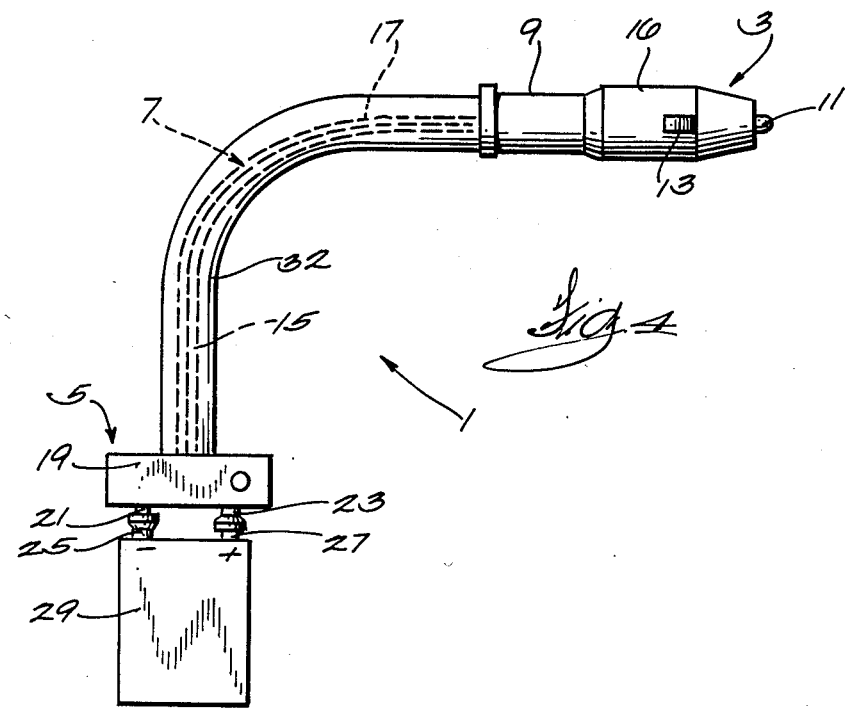
FIG. 4 is a side view of a modified embodiment of the invention.

The insulated electrical conductors 15 and 17 may be the sole mechanical connection between the first and second electrical connectors 3 and 5. In that case, the connection between the two connectors is flexible. Alternately, as shown in FIG. 4, a tube 32, which may be either flexible or rigid, may be used to mechanically join the two connectors. In that situation, the wires 7 are inserted through the tube interior. The tube 32 may be bent as shown, or it may be straight. It may be of any convenient length.

Figure 5:
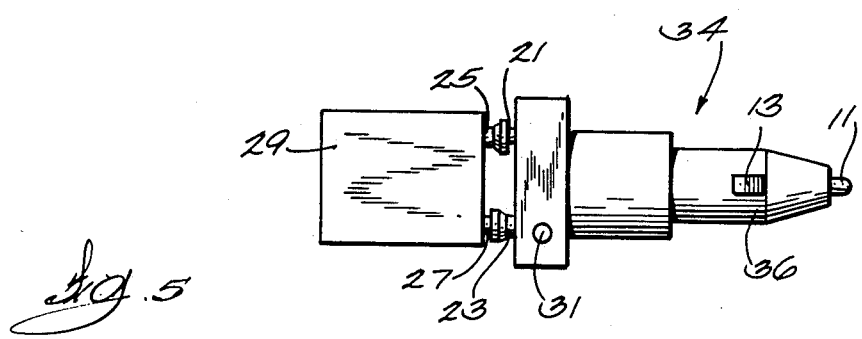
FIG. 5 is a side view of a further modified embodiment of the present invention.

In FIG. 5, the first and second electrical connectors are combined into a single casing 34. The casing 34 has a plug shaped end 36 for inserting into the motor vehicle cigar lighter 39. The wires 7 are completely enclosed within the casing 34.

Figure 2:
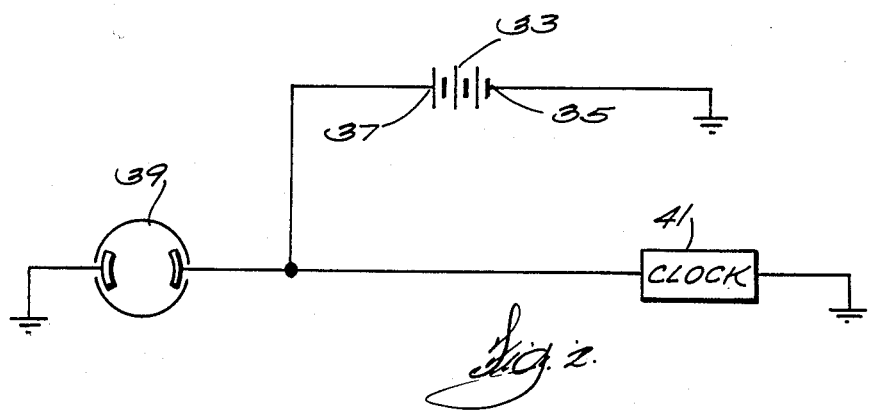
FIG. 2 is an electric schematic of a portion of an automobile electrical circuit under normal operating conditions.

The function of the power supply back-up device 1 will be explained in conjunction with FIGS. 2 and 3. In FIG. 2, reference numeral 33 represents a conventional automotive storage battery installed in a motor vehicle. The negative pole 35 of the battery 33 is connected to electrical ground, and the positive pole 37 is shown connected to the vehicle cigar lighter 39 and to a computer controlled clock 41. It will be understood, of course, that the positive pole 37 is electrically connected with other vehicle electrical components in addition to the lighter 39 and clock 41. FIG. 2 illustrates the normal operating condition for the motor vehicle.

In FIG. 3, it is assumed that the motor vehicle is undergoing servicing such that the battery 33 has been electrically disconnected from the vehicle. It will be appreciated that the battery 33 may remain physically located and mechanically installed within the vehicle. In accordance with the present invention, before the battery 33 is electrically disconnected from the vehicle, the nine-volt battery 29, which preferably is an alkaline battery, is engaged with the second electrical connector 5. The first electrical connector 3 is plugged into the vehicle cigar lighter 39. The lamp 31 will glow when a good connection is made between the power supply back-up device 1 and the vehicle circuit, thus indicating to the service man that it is safe to disconnect the main battery. In that way, electrical power to the computer controlled accessories such as the clock 41 remains uninterrupted. Consequently, the programmed settings in the clock 41 and other accessories are not lost when the normal power source is lost. For safety purposes, the second electrical connector 5 also includes the diode 30, which prevents current from the main battery 33 from damaging the nine-volt battery 29. To prolong the life of the battery 29, it is recommended that the vehicle doors be left closed and that the hood and trunk dome lights be disconnected.

When the service work is complete, the storage battery 33 is reconnected electrically to the vehicle circuits before the back-up device 1 is unplugged from the cigar lighter 39. By using the back-up device of the present invention, the computer powered clocks and other accessories retain their pre-set settings and require no reprogramming or resetting due to vehicle battery disconnection.

Without further description, it is thought that the advantages to be deemed from the disclosed embodiment of the invention will be apparent to those skilled in the art. Further, it is contemplated that various modifications and alterations may be made to the computer memory device of the present invention within the scope of the appended claims without departing from the spirit of the invention.

I claim:

1. A method of providing auxiliary electric power to a motor vehicle comprising the steps of:
   a. providing an auxiliary nine-volt battery;
   b. providing a power supply back-up device having first contacts for engaging said auxiliary battery and second contacts for connecting with a cigar lighter receptacle in a motor vehicle electrical circuit;
   c. connecting the auxiliary battery to the power plug;
   d. inserting the power plug into the motor vehicle cigar lighter receptacle; and
   e. disconnecting the motor vehicle storage battery from the vehicle electrical circuit.

2. The method of claim 1 wherein the step of providing a power plug includes the steps of:
   a. providing lamp means for indicating a good connection between the auxiliary battery and the motor vehicle cigar lighter; and
   b. providing diode means for protecting the auxiliary battery and lamp means from the motor vehicle storage battery.

3. The method of claim 1 wherein the step of providing a power supply back-up device includes the steps of:
   a. providing a first electrical connector containing said second contacts and adapted to be releasably inserted into the motor vehicle cigar lighter receptacle;
   b. providing a second electrical connector containing said first contacts and adapted to releasably engage the poles of the nine-volt battery; and c. providing electrical wires for joining the first electrical connector to the second electrical connector.

4. An auxiliary power supply comprising:
a nine-volt battery, having two poles;
plug means adapted to engage physically with a cigar lighter receptacle in a motor vehicle, and having plug contacts for electrically connecting to said cigar lighter receptacle;
battery connector means, having battery contacts for electrically connected to said poles of said battery; and
flexible means for electrically connecting said battery connector means to said plug means, and for physically supporting said battery, providing spacing apart of said battery connector means from said plug means.

5. An auxiliary power supply as recited in claim 4, wherein said connecting and supporting means comprises an insulated two-conductor cord electrically connecting said plug contacts to said battery connector and physically connecting said plug means and said battery connector means.

6. An auxiliary power supply as recited in claim 5 further comprising electrical indicator means for indicating when said plug means is electrically connected to said cigar lighter receptacle.

7. An auxiliary power supply as recited in claim 6 further comprising current flow control means for preventing current from flowing from said plug toward said nine-volt battery.

8. In combination with a motor vehicle having a storage battery, a cigar lighter receptacle, and at least one computer controlled accessory connected in a vehicle electrical circuit, a power backup device for providing power to said accessory when said storage battery is disconnected from said circuit, said device comprising:
plug means for selectively connecting to said circuit by physical connection to said cigar lighter receptacle;
an auxiliary nine-volt battery having two electrical battery poles;
battery connector means for releasably engaging said battery poles; and
flexible means for electrically connecting said battery connector means to said plug means and for physically supporting said battery a distance apart from said plug means.

9. A combination as recited in claim 8 wherein said connecting and supporting means comprises a tube for supporting said battery connector means a distance from said plug means, containing said lead means therein for electrically connecting said plug means and said battery connector means.

10. A combination as recited in claim 8 wherein said connecting and supporting means comprises a single rigid insulative housing having leads connected therein for electrically connecting said plug means and said battery connector means; and
further comprising electric current flow control means for preventing flow of current within said leads means towards said auxiliary battery.

11. A combination as recited in claim 8 or claim 9 or claim 10 further comprising indicator light means electrically connected between said plug means and said battery connector means for indicating an electrical connection between said auxiliary battery means and said vehicle electrical circuit.

12. A connector device for connecting a dry cell battery to a motor vehicle electrical circuit having a motor vehicle storage battery, for providing power to said circuit while said storage battery is disconnected from said circuit, comprising:
a casing having a first end adapted to be releasably inserted into a cigar lighter receptacle in the motor vehicle electrical circuit and having first electrical contacts for electrically connecting to said motor vehicle electrical circuit and a second end having second contacts for electrically connecting to said dry cell battery;
support and connector means electrically joining said first contacts with said second contacts for conducting electricity from said dry cell battery to said motor vehicle electrical circuit when said casing is inserted into said cigar lighter receptacle and for supporting said dry cell battery; and
electric current flow control means for preventing flow of current from said motor vehicle electrical circuit toward said dry cell battery.

13. A connector device as recited in claim 12 further comprising indicator light means electrically connected between said first electrical contacts and said second contacts for indicating an electrical connection between said dry cell battery and said motor vehicle electrical circuit.

* * * * *